(12) United States Patent
Morimoto et al.

(10) Patent No.: US 8,211,813 B2
(45) Date of Patent: Jul. 3, 2012

(54) COATED BASE FABRIC FOR AIR BAGS AND AIR BAGS

(75) Inventors: Atsushi Morimoto, Ibaraki (JP); Yoshiya Honbo, Hokkaido (JP); Tomomichi Fujiyama, Frankfurt am Main (DE)

(73) Assignee: TORAY Industries, Inc., Tokyo (JP)

( * ) Notice: Subject to any disclaimer, the term of this patent is extended or adjusted under 35 U.S.C. 154(b) by 874 days.

(21) Appl. No.: 10/529,848

(22) PCT Filed: Oct. 3, 2003

(86) PCT No.: PCT/JP03/12707
§ 371 (c)(1), (2), (4) Date: Sep. 20, 2006

(87) PCT Pub. No.: WO2004/031472
PCT Pub. Date: Apr. 15, 2004

(65) Prior Publication Data
US 2007/0031621 A1    Feb. 8, 2007

(30) Foreign Application Priority Data

Oct. 4, 2002   (JP) .................... 2002-292239
Dec. 4, 2002   (JP) .................... 2002-352283
Dec. 26, 2002  (JP) .................... 2002-376972

(51) Int. Cl.
*B32B 5/02*      (2006.01)
(52) U.S. Cl. .................... 442/60; 200/728.1
(58) Field of Classification Search ........... 428/34.1, 428/35.7, 36.1, 36.91; 280/728.1; 442/60, 442/76, 157
See application file for complete search history.

(56) References Cited

U.S. PATENT DOCUMENTS
2001/0046823 A1   11/2001   Sogi et al. ................. 442/59

FOREIGN PATENT DOCUMENTS

| EP | 1 270 800 B1 | 1/2003 |
|----|---|---|
| EP | 1 365 059 A1 | 11/2003 |
| JP | 2853936 B2 | 11/1998 |
| JP | 2001-89949 A | 4/2001 |
| JP | 3206758 B2 | 7/2001 |
| JP | 2001-288641 A | 10/2001 |
| JP | 2001-329468 A | 11/2001 |
| JP | 2001-355144 A | 12/2001 |
| JP | 2003-328244 A | 11/2003 |
| WO | 01/77435 A1 | 10/2001 |

OTHER PUBLICATIONS

Communication pursuant to Rule 114(2) EPC dated Jul. 19, 2010, issued in European Patent Appln. No. 03751321.5-2124.
Journal of the Society of Rubber Industry, Japan, vol. 69, 1996, pp. 23-31 (with partial English translation).
Third Party Observations dated Jul. 6, 2010, and filed in European Patent Appln. No. 03751321.5-2124.

*Primary Examiner* — Arti Singh-Pandey
(74) *Attorney, Agent, or Firm* — Kubovcik & Kubovcik

(57) ABSTRACT

A coated airbag base fabric made of a textile fabric that has an excellent air-barrier property, high heat resistance, improved mountability and compactness and excellent adhesion to a resin film is characterized in that at least one side of the textile fabric is coated with resin, at least part of the single yarns of the fabric are surrounded by the resin, and at least part of the single yarns of the fabric are not surrounded by the resin. An airbag is characterized by using such a coated airbag base fabric. A method for manufacturing the coated airbag base fabric is characterized by applying a resin solution having a viscosity of from 5 to 20 Pa·s (5,000 to 20,000 cP) to the textile fabric using a knife coater with a sharp-edged coating knife at the contact pressure between the coating knife and the fabric of from 1 to 15 N/cm.

18 Claims, 5 Drawing Sheets

(1)

(2)

COATED BASE FABRIC FOR AIR BAGS AND AIR BAGS

This application is a 371 of international application PCT/JP2003/012707, which claims priority based on Japanese patent application Nos. 2002-292239, 2002-352283 and 2002-376972 filed October 4, December 4 and Dec. 26, 2002, respectively, which are incorporated herein by reference.

TECHNICAL FIELD

The present invention relates to a coated airbag base fabric that has an excellent air-barrier property, high heat resistance, and improved mountability and compactness, as well as excellent adhesion to a resin film. The present invention also relates to an airbag made of the coated base fabric.

BACKGROUND ART

In recent years, airbags of different types have been developed to protect an occupant from various traffic accidents, in particular car accidents, and rapidly come into practical use as their effectiveness is recognized. Since the airbags are used under any circumstance, they are required to have stable mechanical performance even in severe environments like high temperature and low temperature.

Conventionally, the airbags have been manufactured in the following manner. A plain weave fabric made of 334 to 1,112 dtex nylon 6,6 or nylon 6 filament yarns is coated with an elastomer of, for example, a synthetic rubber, such as chloroprene, chlorosulfonated olefin, or silicone to improve the heat resistance, the flame resistance, and the air-barrier property of the fabric. Then, the resulting laminated base fabric is cut and sewed into a bag.

When a filament fabric is coated with, for example, a chloroprene elastomer to manufacture a base fabric, 90 to 120 g/m$^2$ of the chloroprene elastomer must be applied to the filament fabric to improve the heat resistance and the flame resistance of the base fabric. However, this undesirably increases the thickness and the packed volume of the base fabric, resulting in poor mountability of the base fabric. When a silicone elastomer, which has higher heat resistance and higher cold resistance than the chloroprene elastomer, was used, the coating weight was reduced to 40 to 60 g/m$^2$. Thus, the mountability and compactness was improved significantly, but it was still not satisfying. The bag thus manufactured had another problem in that the bag was hard to fold into a package when the bag was folded and mounted.

Thus, a base fabric coated with a smaller amount of silicone has recently been studied to solve such problems. For example, an airbag characterized in that an elastomer 3.0 times or more as thick as weaving yarns constituting the fabric is predominantly applied to the mesh of the fabric is proposed (see, for example, Japanese Patent No. 2853936). Although this airbag has improved mountability and compactness, the adhesion between the resin film and the fabric is not satisfying. Another proposition is a method for manufacturing an airbag fabric, characterized in that woven filaments are impregnated with an aqueous silicone resin emulsion such that the deposit of the silicone resin ranges from 0.1 g/m$^2$ to 10 g/m$^2$ (see, for example, Japanese Patent No. 3206758). While this method improves the adhesion between the resin film and the fabric to some extent, the air-barrier property or the mountability and compactness are not satisfactory.

DISCLOSURE OF INVENTION

In light of such problems of the conventional airbags, the present invention provides a coated airbag base fabric that exhibits an excellent air-barrier property, high heat resistance, and improved mountability and compactness, as well as excellent adhesion to a resin film. The present invention also provides an airbag made of the coated airbag base fabric. The present invention further provides a method for manufacturing the coated airbag base fabric.

The present invention adopts the following countermeasures to solve such problems.

That is, the coated airbag base fabric according to the present invention is characterized in that at least one side of the textile fabric is coated with resin, at least part of single yarns constituting the fabric are surrounded by the resin, and at least part of single yarns constituting the fabric are not surrounded by the resin.

The airbag according to the present invention is characterized by using such coated airbag base fabric.

The method for manufacturing the coated airbag base fabric is characterized in that the textile fabric is coated with a resin solution having a viscosity of from 5 to 20 Pa·s (5,000 to 20,000 cP) using a knife coater with a sharp-edged coating knife. The contact pressure between the coating knife and the fabric ranges from 1 to 15/cm.

Figure 1:
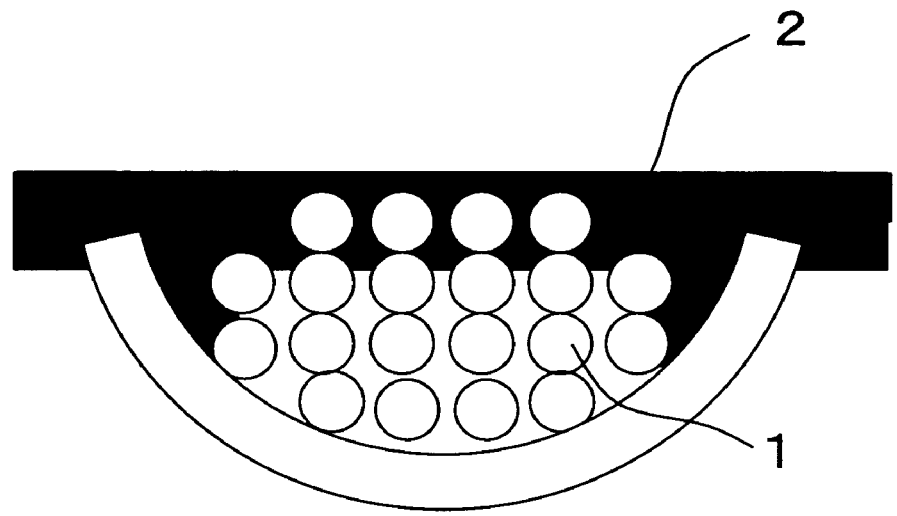
FIG. 1 is a schematic cross-sectional view of a coated airbag base fabric according to the present invention.

Reference numeral 1 represents single yarns (fibers), reference numeral 2 represents resin, reference numeral 3 represents the penetration depth of the resin from the surface of the filament yarns of the fabric, reference numeral 4 represents the height of the multifilament of the fabric, reference numerals 5 and 6 represent folding directions of the airbag, reference numeral 7 represents a horizontal direction of a base fabric before a coating knife is placed on the base fabric, reference numeral 8 represents a relative position of the coating knife relative to the fabric, reference numeral 9 represents the fabric, and reference numeral 10 represents the coating knife.

BEST MODE FOR CARRYING OUT THE INVENTION

Examples of a textile fabric in the present invention include synthetic fiber fabrics made of nylon 6,6; nylon 6; nylon 12; nylon 4,6; copolymerization of nylon 6 and nylon 6,6; polyamide fibers prepared by copolymerization of nylon 6, polyalkylene glycol, dicarboxylic acid, amine and the like; homopolyester fibers, such as polyethylene terephthalate and polybutylene terephthalate; polyester fibers prepared by copolymerization of an acid component, which is a repeating unit of the polyester, and aliphatic dicarboxylic acid, such as isophthalic acid, 5-sulfoisophthalic acid sodium salt, or adipic acid; aramid fibers prepared by copolymerization of, for example, p-phenylene terephthalamide and an aromatic ether; rayon fibers; polysulfone fibers; ultra high molecular weight polyethylene fibers; and polymer arrangement fibers having a sea-island structure based on the synthetic fibers described above. Among these, polyamide fibers and polyethylene terephthalate fibers are preferred. Nylon 6,6 and nylon 6 are more preferred in terms of impact resistance. Such fibers may contain various additives commonly used to improve productivity or characteristics in a manufacturing step or a processing step of yarn. For example, the fibers may contain a heat stabilizer, an antioxidant, a light stabilizer, a lubricating agent, an antistatic agent, a plasticizer, a thickener, a pigment, and/or a flame retardant.

In the coated airbag base fabric according to the present invention, at least one side of the textile fabric must be coated with resin. Coating at least one side of the textile fabric with resin allows the textile fabric to have an air-barrier property and to resist high-temperature nitrogen gas generated from an inflator. The resin used in the present invention may be of any type. Among others, a heat-resistant, cold-resistant, and flame-resistant resin is preferred. Examples of such a resin include a silicone resin, a polyamide resin, a polyurethane resin, and a fluorocarbon resin. Among them, the silicone resin is particularly preferred because of its high heat resistance, high cold resistance and excellent air-barrier property. Examples of such a silicone resin include a dimethyl silicone resin, a methyl vinyl silicone resin, a methylphenyl silicone resin, and a fluorosilicone resin. Preferably, the resin contains a flame-resistant compound. Examples of such a flame-resistant compound include a halogenated compound containing bromine, chlorine and/or the like, in particular a halogenated cycloalkane; a platinum compound; antimony oxide; copper oxide; titanium oxide; a phosphorus compound; a thiourea compound; carbon; cerium; and silicon oxide. Among these, halide, a platinum compound, copper oxide, titanium oxide, and carbon are preferred because they improve the flame resistance without adversely affecting the characteristics, such as heat resistance, of the silicone resin. Such a silicone resin may be appropriately selected from a solvent-based silicone resin, an aqueous silicone resin, and a water-dispersed silicone resin. Among these, a solventless silicone resin is preferred, because this resin has smaller environmental impact and requires simple facilities without explosion-proof.

In the coated airbag base fabric according to the present invention, it is important that at least part of single yarns of the fabric are surrounded by the resin, and at least part of single yarns of the fabric are not surrounded by the resin (see, FIG. 1). The term "single yarn" means one of single yarns constituting multifilament when the textile fabric is composed of multifilament yarns. Surrounding at least part of the single yarns constituting the fabric with the resin increases the adhesion between the fabric and the resin film. On the other hand, at least part of the single yarns constituting the fabric resin and not surrounded by the resin impart flexibility to the coated airbag base fabric.

Figure 2:
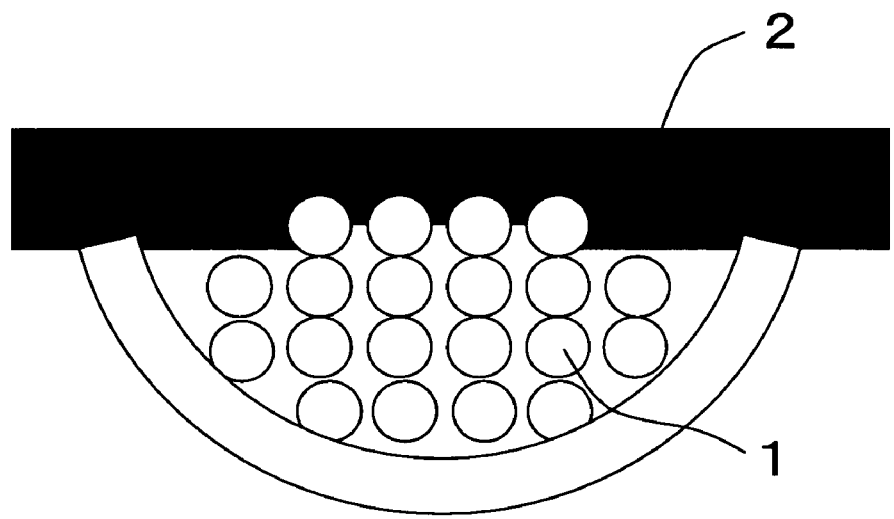
FIG. 2 is a schematic cross-sectional view of a conventional coated airbag base fabric.
Figure 3:
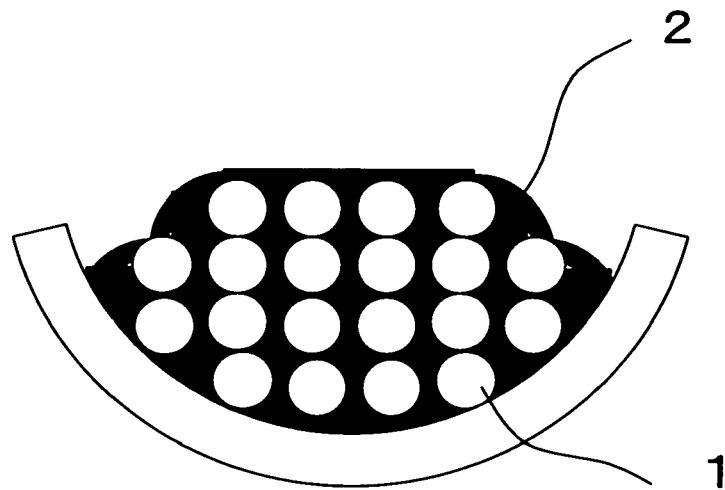
FIG. 3 is a schematic cross-sectional view of an airbag base fabric manufactured by a conventional impregnation method.

As shown in FIG. 2, in a coated airbag base fabric manufactured by a conventional coating method, a film of resin 2 on the surface of the fabric prevents single yarns 1 of the fabric from being surrounded by the resin 2. As a result, although the fabric has an excellent air-barrier property, the adhesion between the fabric and the resin film is poor. Furthermore, as shown in FIG. 3, in an airbag base fabric manufactured by a conventional impregnation method, a resin 2 spreads into the fabric; that is, almost all the single yarns are surrounded by the resin 2. However, a resin film is hardly formed at the intersections (the intersections between the warp and the weft) in the fabric. As a result, air is likely to leak from the intersections of the fabric. This deteriorates the air-barrier property of the fabric. Furthermore, since almost all the single yarns are surrounded by the resin, the fabric loses flexibility. Thus, the present invention eliminates such defects in the base fabrics manufactured by the conventional coating method or the conventional impregnation method. That is, the resin is applied to the fabric as shown in FIG. 1. Basically, the film of resin 2 on the surface of the fabric exhibits an air-barrier property. In addition, surrounding at least part of the single yarns 1 constituting the fabric with the resin 2 increases the adhesion between the resin film and the fabric. The other part of the single yarns are not surrounded by the resin and impart flexibility to the coated airbag base fabric.

The percentage of the single yarns surrounded by the resin is preferably in the range of 3% to 20% and is more preferably in the range of 5% to 15% of the total single yarns to satisfy both the adhesion between the fabric and the resin and the flexibility of the base fabric. When the percentage of the single yarns surrounded by the resin is less than 3%, the adhesion between the fabric and the resin decreases, although the base fabric is flexible. When the percentage of the single yarns surrounded by the resin is more than 20%, the airbag base fabric loses flexibility, although the adhesion between the fabric and the resin is excellent.

Figure 4:
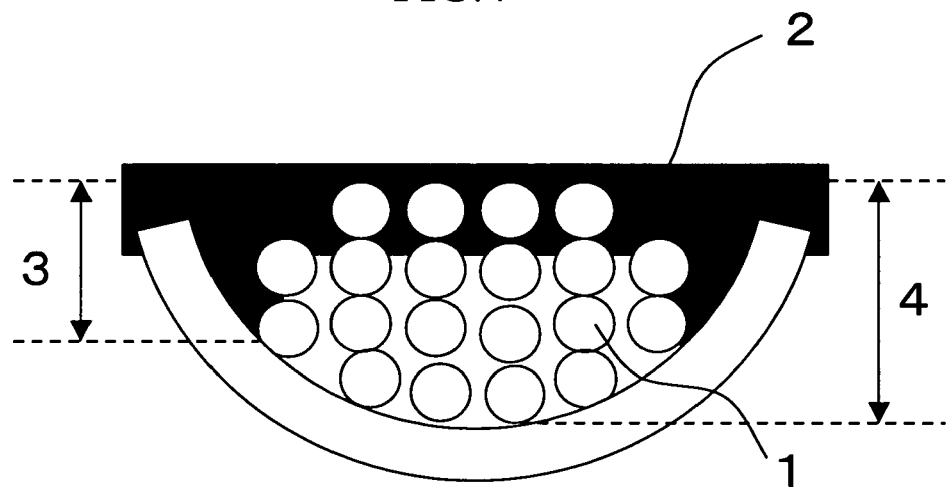
FIG. 4 is a schematic view illustrating a method for determining the penetrability.

The resin infiltrates into the fabric preferably to the thickness of from 10% to 70% and more preferably from 15% to 50% of the thickness of the fabric to satisfy both the adhesion between the fabric and the resin and the flexibility of the airbag base fabric. The percentage of the penetration depth based on the thickness of the fabric refers to the percentage of the resin infiltrating into the multifilament of the fabric. In other words, the percentage of the penetration depth is calculated by dividing the penetration depth 3 of the resin from the surface of the fabric by the height 4 of the multifilament in the cross section of the fabric multifilament (see, FIG. 4). The surface of the fabric is covered with the resin. The penetration depth of the resin refers to the distance from the surface of the fabric to the deepest point of the penetration.

When the penetrability of the resin is less than 10%, the adhesion between the fabric and the resin decreases, although the airbag base fabric is flexible. When the penetrability of the resin is more than 70%, the airbag base fabric loses flexibility, although the adhesion between the fabric and the resin is excellent.

Preferably, the deposit of the resin is in the range of 5 to 30 g/m$^2$ in terms of the thickness, the weight, the air-barrier property, and the mountability and compactness of the base fabric. More preferably, the deposit of the resin is in the range of 5 to 20 g/m$^2$ in terms of the mountability and compactness. When the deposit of the resin is less than 5 g/m$^2$, the surface of the fabric is hardly covered with the resin film, leading to possible air leakage. On the other hand, when the deposit of the resin is more than 30 g/m$^2$, the thickness of the resin on the surface of the fabric may increase, or the amount of the resin in the fabric may increase. Thus, the airbag base fabric loses flexibility and has poor mountability and compactness, although the air-barrier property is excellent.

The fineness of the weaving yarn used in the synthetic fiber textile of the airbag base fabric according to the present invention is preferably in the range of 90 to 600 dtex and more preferably in the range of 150 to 470 dtex to attain a proper balance among the mechanical properties, the thickness, and the weight of the airbag base fabric. When the fineness of the weaving yarn is less than 90 dtex, the mechanical strength decreases, although the weight of the airbag base fabric decreases advantageously. When the fineness of the weaving yarn is more than 600 dtex, the thickness and the weight increase. This leads to poor mountability of the airbag base fabric. The fineness of the fibrils constituting the weaving yarn is preferably in the range of 1 to 6.5 dtex and more preferably in the range of 2 to 4.5 dtex in terms of the mountability and the adhesion to the resin. The fibril smaller than 1 dtex may hamper the production of the yarn. The fibril larger than 6.5 dtex increases the thickness of the fabric and thus causes strong repulsion of the airbag base fabric when the airbag is folded. This results in poor mountability. The single yarns within the above-mentioned fineness range allow the coated resin to infiltrate easily through the single yarns and easily surround the single yarns.

The single yarn may have a flat cross section, instead of a round cross section. Use of the single yarn having a flat cross section with the ratio of the major axis to the minor axis, that is, the aspect ratio of 1.5 to 6 can decrease the thickness of the base fabric and improve the mountability. The yarn having the flat cross section is usually elliptical, but may be of any other shape having the aspect ratio of 1.5 to 6. For example, the yarn may have a symmetrical shape, such as rectangle, rhombus, or cocoon-shape, an asymmetrical shape, or a combination thereof. Furthermore, on the basis of these basic shapes, the yarn may have a projection, a depression, or a partly hollow portion. In particular, the single yarn having an elliptical cross section can make the surface of the fabric flat and narrow the space among the fabric yarn. Accordingly, a smaller amount of resin is required to fill the space. This reduces the amount of the coating and is desirable in terms of the mountability and the cost.

The yarn is preferably no-twist yarn in terms of the adhesion between the fabric and the resin. When the yarn is twisted, the multifilament gathers. Thus, it is difficult to infiltrate the resin through the single yarns. As a result, it is also difficult to surround the single yarns with the resin. This is not desirable from the viewpoint of the adhesion between the fabric and the resin. Furthermore, when the yarn is twisted, the fabric will have a rough surface. Thus, a larger amount of the resin is required to flatten the fabric surface. This not only increases the weight of the base fabric and deteriorates the mountability, but also increases the cost.

The fabric structure may be a woven fabric, such as a plain weave, a twill weave, a satin weave, their derivative weaves, or a multi-shaft weave, a nonwoven fabric, or spunbond. Among these, the plain weave fabric is preferred because of its excellent mechanical properties, a low fabric cost, and the isotropic expansion of the airbag. Such a fabric is not necessarily a symmetrical weave and may be an asymmetrical weave. Examples of the asymmetrical weave include a plain weave fabric having warp and weft of different numbers, different types, and different structures, such as a ripstop and a thinned-out structure.

Machines for weaving the fabric that constitutes the base fabric according to the present invention may be appropriately selected from various machines for weaving industrial fabrics, including a shuttle loom, a water-jet loom (WJL), an air-jet loom (AJL), and a rapier loom. Among these, the water-jet loom (WJL) is preferred, because this loom produces less residual oil solution in the airbag base fabric and has increased productivity. The residual oil solution may affect the flame resistance of the fabric.

Preferably, the residual oil content in the coated airbag base fabric according to the present invention is 0.1% by weight or less to maintain the flame resistance. The residual oil content was determined for the resin-coated base fabric according to the following procedure.

After about 10 g of a fabric sample or a base fabric sample is obtained, the sample is placed in a hot-air dryer at 105° C. for 1.5 hours. Then, the mass (S) of the sample is measured with a chemical balance. Then, the sample is placed in an Erlenmeyer flask. Then, 120 ml of n-hexane in a graduated cylinder is poured into the Erlenmeyer flask. The mixture in the Erlenmeyer flask is stirred for 10 minutes on a shaker to extract oil solution components. After the extraction, the base fabric sample is removed from the solution. A hundred milliliter of the solution is measured with a graduated cylinder and is poured into a round flask of a known weight ($W0$). Then, n-hexane is removed from the solution in the round flask by Soxhlet extraction. After the removal of n-hexane, the round flask is dried in a vacuum dryer at 5 mmHg and 25° C. for 1 hour, is cooled in a desiccator for 15 minutes, and is weighed ($W1$). The oil content in the base fabric is calculated according to the following equation:

$$\text{Oil Content}(\%) = (W1 - W0)/(S \times 100/120) \times 100$$

To reduce the residual oil content in the base fabric to 0.1% by weight or less, the residual oil content in the synthetic fiber fabric before the resin coating is preferably 0.1% by weight or less. By reducing the residual oil content in the fabric to 0.1% by weight or less, the residual oil content in the base fabric can also be reduced. This is also preferred in terms of the flame resistance.

The relationship between the center thickness $T1$ and the end thickness $T2$ of the coating on the coated airbag base fabric according to the present invention is expressed preferably by $0.9 \leq T1/T2$ and more preferably by $0.95 \leq T1/T2$. When $T1/T2$ is less than 0.9, the airbag after cutting and sewing also has large variations in the thickness. Thus, the airbag does not expand isotropically and has a poorer high-speed expansion ability to receive the occupant. Furthermore, the airbag is ununiformly exposed to high temperature gas during the expansion, and therefore may be largely damaged by the heat.

In the coated airbag base fabric according to the present invention, the relationship between the width W of the base fabric and the width C of the resin coat is preferably expressed by $0.95 \leq C/W \leq 0.99$. When the C/W is less than 0.95, the base fabric will be lost greatly when it is cut into the airbag. This decreases the cost performance. When the C/W is more than 0.99, resin-coated portions at both ends of the base fabric will be grasped during heat set after the resin coating. This may cause wrinkle and lowers the quality.

Preferably, the air permeability of the coated airbag base fabric according to the present invention is 0.01 cc/cm$^2$/s or less, as determined by the method according to JIS L1096A (fluid (air) pressure 125 Pa). In addition, the air permeability is preferably 1 cc/cm$^2$/s or less, as determined by the air flow rate passing through the coated airbag base fabric at a fluid (air) pressure of 19.6 kPa. Adjusting the air permeability to this range allows various airbag designs to be applied to many positions. Thus, the coated airbag base fabric according to the present invention may be suitably used in applications requiring very low air permeability, such as an inflatable curtain, a knee airbag, and a smart bag.

The weight of the coated airbag base fabric according to the present invention is preferably 300 g/m$^2$ or less, and more preferably 250 g/m$^2$ in terms of the weight reduction. The thickness of the coated airbag base fabric according to the present invention is preferably 0.35 mm or less and more preferably 0.33 mm or less in terms of the mountability and compactness. The bending resistance of the coated airbag base fabric according to the present invention is preferably less than 100 mm in both a warp direction and a weft direction in terms of the mountability and compactness. Preferably, the airbag base fabric has a tensile force of 300 N/cm or more, an elongation at break of 15% or more, and a tear strength of 100 N or more to achieve improved mountability as an airbag and to prevent the airbag from rupturing.

Assuming the thermal damage, caused by high temperature gas during the expansion of the airbag, to the coated airbag base fabric according to the present invention, the base fabric preferably has the flame resistance less than 100 mm/min and more preferably less than 80 mm/min, as determined according to FMVSS302.

The coated airbag base fabric according to the present invention may be used in airbags for a driver seat, a passenger seat, a rear seat, and a sideseat, an inflatable curtain, and a knee airbag. The coated airbag base fabric according to the present invention may also be used in functionally applicable portions, such as a head-bag for a rear-end collision, a minibag for protecting an infant, an airbag for protecting feet, and an airbag for a seatbelt. The shape and the size of the coated airbag base fabric according to the present invention may be designed to satisfy the requirements.

The coated airbag base fabric according to the present invention may be manufactured by applying a resin solution having a viscosity of 5 to 20 Pa·s (5,000 to 20,000 cP) to a textile fabric using a knife coater with a sharp-edged coating knife. The contact pressure between the coating knife and the fabric may range from 1 to 15 N/cm.

The term "viscosity" of the resin solution means the viscosity measured with a Brookfield type viscometer according to JIS Z8803. The viscosity of the resin solution less than 5 Pa·s (5,000 cP) is too low for the knife coating. In this case, the resin infiltrates into the base fabric and thus deteriorates the low air-permeability of the base fabric. In addition, a larger amount of the resin is required to achieve the low air-permeability. This results in poor mountability. By contrast, when the viscosity of the resin solution is more than 20 Pa·s (20,000 cP), the viscosity is too high to reduce the coating weight of the resin (thin uniform coating). This deteriorates the mountability and increases the cost. In addition, the resin solution reduces its tendency to infiltrate through the single yarns of the fabric and thus cannot fully surround the single yarns.

The knife coating is used as the coating method by consideration of a low coating weight of the resin and the penetrability of the resin to the fabric. While the knife coating includes a knife-over-roll method, a knife-over-belt method, and a floating knife technique, the floating knife technique is preferably used by consideration of a low coating weight of the resin and the penetrability of the resin to the fabric.

Furthermore, a sharp-edged coating knife is used as a coating knife to reduce the coating weight. As for the shape of the coating knife, a circular knife or a sheeting knife may be used. Among them, the sheeting knife is preferred by consideration of a low coating weight of the resin and the penetrability of the resin to the fabric.

Figure 7:
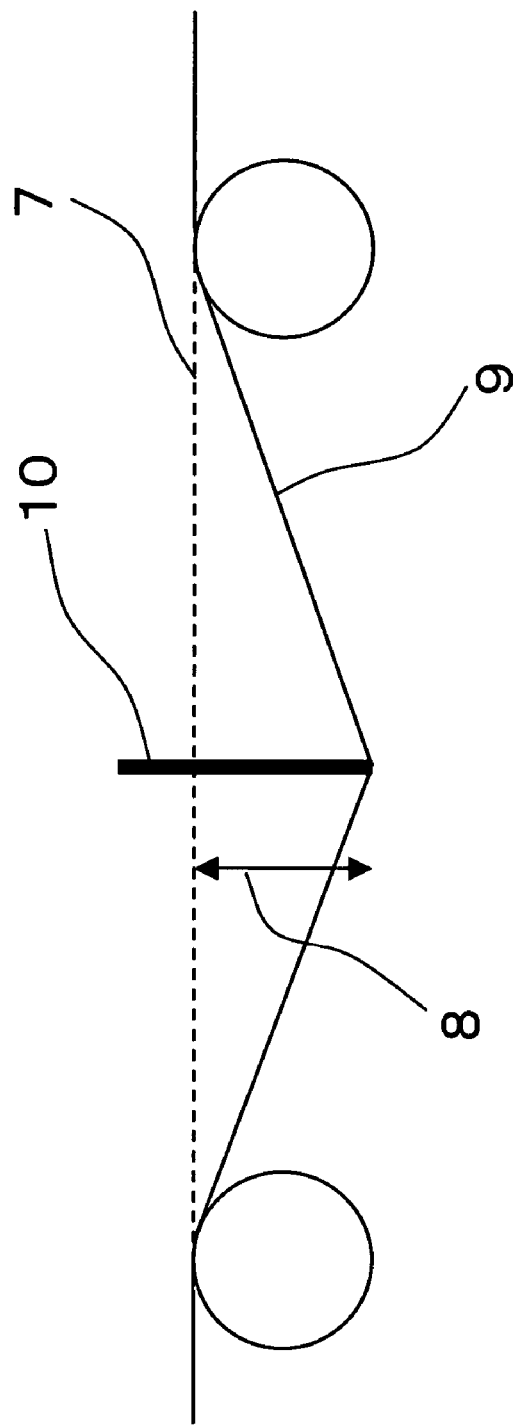
FIG. 7 is a schematic view illustrating a process for applying resin.

The contact pressure of the coating knife to the fabric is important in infiltrating the resin into the fabric to some extent, and in surrounding the single yarns of the fabric with the resin. The contact pressure should be adjusted to 1 to 15 N/cm. The contact pressure less than 1 N/cm is so low that the resin hardly infiltrates into the fabric. Thus, the resin cannot fully surround the single yarns of the fabric. Furthermore, this may result in a large amount of the coated resin, a heavy base fabric, and poor mountability and compactness. By contrast, when the contact pressure is more than 15 N/cm, the fabric may not be subjected to the next step. That is, the multifilament of the fabric may be shaved by the knife. This causes the single yarn to break, leading to poor quality. In addition, it is difficult to surround the fabric with the resin film. Thus, a target resin coating weight cannot be achieved, and therefore the air-barrier property will be deteriorated. To adjust the contact pressure to the above-mentioned range, when the floating knife technique is used, for example, the contact pressure is controlled by the penetration depth of the coating knife in the fabric. That is, the position of the coating knife relative to the fabric is adjusted preferably to 1 to 5 cm to satisfy the contact pressure condition described above. The relative position 8 herein refers to the position where the coating knife 10 is placed on the base fabric 9 in the direction perpendicular to the horizontal direction 7 of the base fabric before the coating knife is placed (see FIG. 7).

Preferably, the tension of the base fabric during coating is from 500 to 3,000 N/m. This temporarily improves the wavy selvedge of the fabric during the coating and controls the width of the coating. When the tension of the base fabric is less than 500 N/m, the wavy selvedge of the fabric cannot be improved, and the coating cannot have a sufficient width. When the tension of the base fabric is more than 3,000 N/m, the tension may be ununiform in the width direction of the fabric. In addition, the dimensional stability may be deteriorated by the shrinkage during the production of the airbag.

The scouring/setting before the coating is performed to eliminate the wavy selvedge of the base fabric and to carry out the coating smoothly. In the present invention, the resin is applied to the base fabric while the tension of the base fabric is maintained preferably at 500 to 1,500. Thus, the coating can be performed while the wavy selvedge is leveled off. Thus, for the purpose of the cost reduction, it is preferred to use a gray fabric or a fabric after the setting of the gray fabric and not to perform the scouring/setting.

EXAMPLE

The present invention will be described in more detail by way of Examples. Various evaluations in the Examples were performed according to the following methods. Percentage of fibers surrounded by resin based on total fibers constituting base fabric (percentage of surrounding): A cross section of a fabric was photographed with a scanning electron microscope (SEM) under conditions described below. Among single yarns constituting one multifilament, the number of single yarns surrounded by the resin was counted. The percentage of surrounding is expressed by the following equation:

(Number of single yarns surrounded by resin)/(Number of single yarns constituting one multifilament)×100(%)

Penetrability: A cross section of the fabric was photographed with a scanning electron microscope (SEM) under conditions described below. The penetration depth of the resin in the fabric from the surface and the height of the multifilament were measured. The penetrability is expressed by the following equation:

(Penetration depth of resin in fabric from the surface)/ (Height of multifilament)×100

Mass per unit area (resin deposit): The mass of the resin per unit area was determined by JIS L1096 (8.4.2 method). Thickness: The thickness was determined by JIS L1096 (8.5 method). A measured value at the center of a base fabric was obtained by dividing the base fabric into three portions in the width direction, measuring the thickness at five points in the middle portion, and calculating a mean value from the five data points. A measured value at the ends of coating was a mean value calculated from measurements at six points, three points from each end of the coating to the center of the base fabric at 1 cm intervals.

Residual oil content: About 10 g of a fabric sample or a base fabric sample was taken and was placed in a hot-air dryer at 105° C. for 1.5 hours. After the mass (S) of the sample was measured with a chemical balance, the sample was placed in an Erlenmeyer flask. Then, 120 ml of n-hexane in a graduated cylinder was poured into the Erlenmeyer flask. The mixture in the Erlenmeyer flask was stirred for 10 minutes on a shaker to extract oil solution components. After the extraction, the base fabric sample was removed from the solution. A hundred milliliters of the solution was measured and was poured into a round flask of a known weight (W0). Then, n-hexane was removed from the solution in the round flask by Soxhlet extraction. After the extraction, the round flask was dried in a vacuum dryer at 5 mmHg and 25° C. for 1 hour, was cooled in a desiccator for 15 minutes, and was weighed (W1). The oil content in the base fabric was calculated according to the following equation:

$$\text{Oil Content}(\%) = (W1 - W0)/(S \times 100/120) \times 100$$

Tensile force: The breaking stress was determined according to JIS L1096 (8.12.1A method). The width of the fabric was 3 cm, the length of the fabric between grips was 15 cm, and the rate of pulling was 200 mm/min.

Elongation at break: The elongation at break was determined according to JIS L1096 (8.12.1A method). The width of the fabric was 3 cm, the length of the fabric between grips was 15 cm, and the rate of pulling was 200 mm/min.

Tear strength: The tear strength was determined according to JIS L1096 (8.15.2A-2 method). The rate of pulling was 200 mm/min.

Bending resistance: The bending resistance was determined according to JIS L1096 (8.19.1A method).

Air permeability: The air permeability was determined according to JIS L1096 (8.27.1A method: fluid (air) pressure 125 Pa) and was also determined based on the air flow rate passing through a sample at a fluid (air) pressure of 19.6 kPa.

Adhesion of resin: Peeling of the resin film was tested according to JIS K6328 (5.3.8 method). The number of rubbing was 500.

Flame resistance: The flame resistance was determined according to FMVSS-302.

Viscosity: The viscosity was measured with a Brookfield type viscometer at a thermostat temperature of 25° C. according to JIS Z8803 (8).

Mountability and compactness: Two circular fabrics having a diameter of 725 mm were cut by a punching method from an airbag base fabric. Three circular reinforcing fabrics having a diameter of 200 mm and made of the same fabric were laminated in the center of one of the two circular clothes. The one circular cloth and the three circular reinforcing fabrics were machine-sewed by lockstitch along the perimeters of circles 110 mm, 145 mm, and 175 mm in diameter with needle and bobbin threads of 1,400 dtex nylon 6,6 fibers. An opening having a diameter of 90 mm was provided as a mounting hole for an inflator. One circular reinforcing fabric having a diameter of 75 mm and made of the same fabric was placed 255 mm away from the center in the bias direction. The circular reinforcing fabric was machine-sewed by lockstitch along the perimeters of circles 50 mm and 60 mm in diameter with needle and bobbin threads of 1,400 dtex nylon 6,6 fibers. Two ventholes having a diameter of 40 mm were provided.

Then, the circular fabric was placed on the other circular fabric with the reinforcing fabric side out while each warp was crossed at 45 degrees. The circular reinforcing fabric was machine-sewed by a double-thread chain stitch along the perimeters of circles 700 mm and 710 mm in diameter with needle and bobbin threads of 1,400 dtex nylon 6,6 fibers. Then, the bag was turned inside out. An airbag having a volume of 60 L was thus manufactured.

Figure 5:
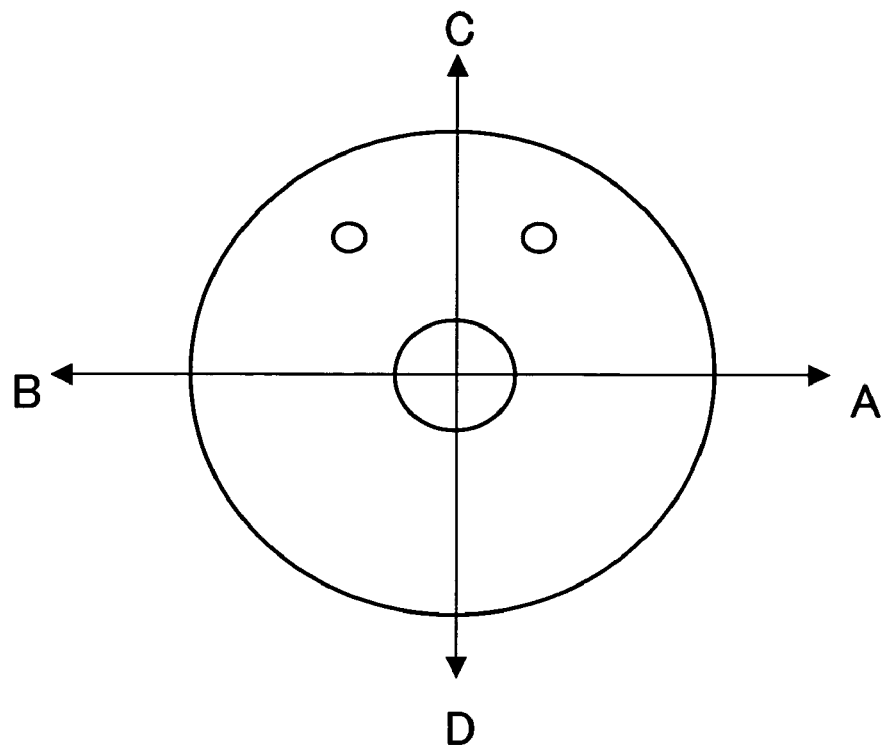
FIG. 5 is a schematic view illustrating a procedure for folding an airbag in a mountability test.
Figure 5:
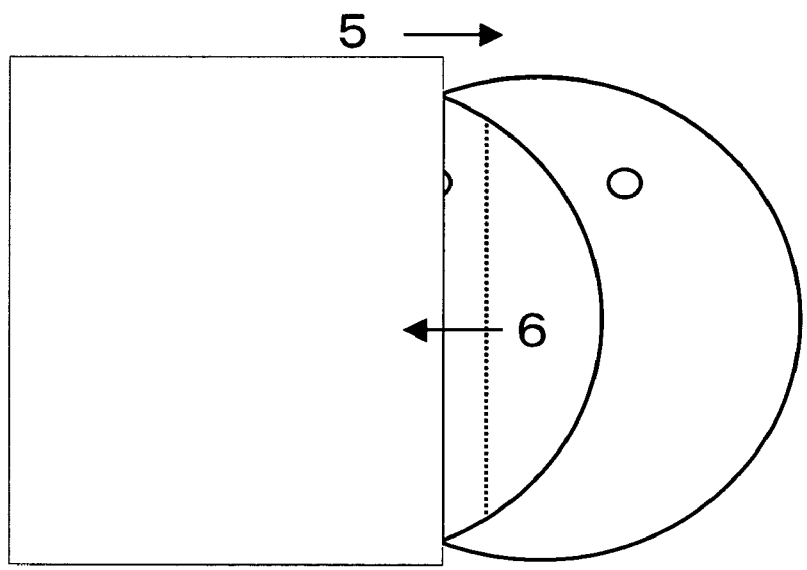

The 60 L airbag was folded in two directions parallel to an AB axis and a CD axis in FIG. 5(1). First, as shown in FIG. 5(2), the airbag was folded in an A direction along a line 5 at 270 mm away from the end of the base fabric in a B direction. Second, the airbag was folded in the B direction along a line 6 at 200 mm away from the folded base fabric end. Third, the airbag was folded in the A direction along a line at 130 mm away from the folded base fabric end. Symmetrically to this folded base fabric portion, the airbag was folded in the B direction along a line at 270 mm away from the end of the base fabric in the A direction. Then, the airbag was folded in the A direction along a line at 200 mm away from the folded base fabric end, and was folded in the B direction along a line at 130 mm away from the folded base fabric end. Then, to manufacture a folded airbag 150 mm×150 mm in size, the airbag was folded in a D direction along a line at 270 mm away from the end of the base fabric in a C direction. Then, the airbag was folded in the C direction along a line at 105 mm away from the end of the base fabric in the D direction, and was folded in the D direction along a line at 75 mm away from the end of the base fabric in the C direction. In the same manner, symmetrically to this folded base fabric portion, the airbag was folded in the C direction along a line at 270 mm away from the end of the base fabric in the D direction. Then, the airbag was folded in the D direction along a line at 105 mm away from the folded base fabric end, and was folded in the D direction along a line at 75 mm away from the folded base fabric end. The thickness of the folded airbag was measured under a load of 10 N. The thickness of the folded airbag was measured again at 1 minute after the load was removed.

Figure 6:
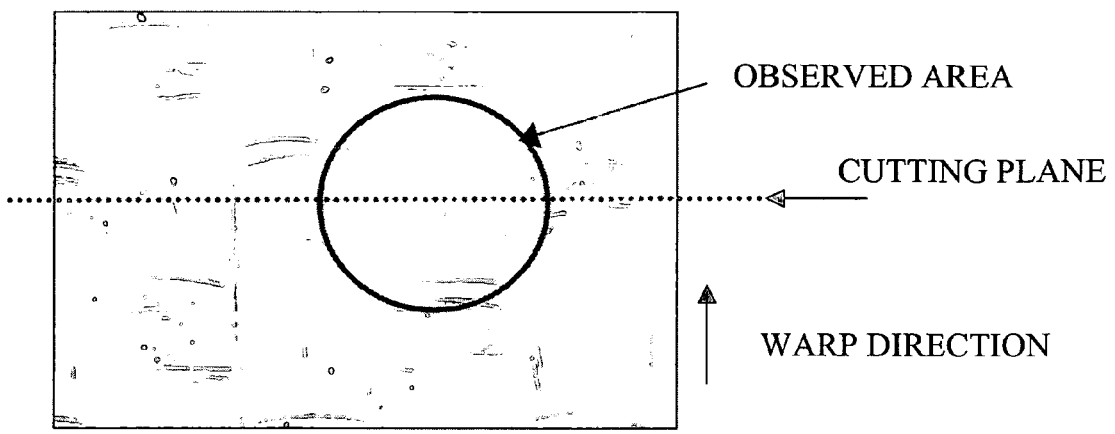
FIG. 6 is an illustrative picture showing a fabric cross section to be photographed with a scanning electron microscope.

Photographing conditions of scanning electron microscope (SEM): A cross section of the fabric cut in a position shown in FIG. 6 was photographed with a Hitachi S-3500N scanning electron microscope. The magnification was 200, the resolution was 640×480, and the scanning speed was 80/100 s.

Cover factor: The cover factor was calculated by the following equation: $(D_1 \times 0.9)^{1/2} \times N_1 + (D_2 \times 0.9)^{1/2} \times N_2$, wherein $D_1$ (dtex) denotes the total fineness of the warp, $N_1$ (/2.54 cm) denotes the weave density of the warp, $D_2$ (dtex) denotes the total fineness of the weft, and $N_2$ (/2.54 cm) denotes the weave density of the weft in the base fabric.

Yarns used in the Examples were produced by the following method.

Nylon 66 chips having a 98% sulfuric acid relative viscosity of 3.7 at 25° C. were melt-spun at 295° C. with a spinning extruder. Each spinning machine had a spinneret having a different oblateness, a different shape, and a different number of holes. A line of thread was spun from a spinning pack having this spinneret. Airbag yarns of 470 dtex, 350 dtex, and 235 dtex were spun by a direct spinning and drawing process.

Example 1

Filament yarns used had a circular cross section and were made of no-twist nylon 6,6 fibers having the total fineness of 470 dtex, 72 filaments, the strength of 8.4 cN/dtex, the extension percentage of 22%, and the aspect ratio of 1.0. A plain weave fabric was manufactured from the filament yarns with a water-jet loom. The warp tension was 70 cN per warp. The weave densities of the warp and the weft were both adjusted to 46/2.54 cm. Then, the fabric was coated with a solventless methyl vinyl silicone resin solution having a viscosity of 12

Pa·s (12,000 cP) using a floating knife coater with a sheeting knife. The contact pressure between the fabric and the sheeting knife was maintained at 9 N/cm. The deposit of the resin was adjusted to 15 g/m². Then, the coated fabric was vulcanized at 190° C. for 2 minutes. A coated airbag base fabric was thus manufactured.

The characteristics of the airbag base fabric thus manufactured were shown in Table 1. The airbag base fabric was excellent in the air-barrier property, the airbag mountability and compactness, and the flame resistance. The airbag base fabric also exhibited excellent adhesion to the resin.

Comparative Example 1

A coated airbag base fabric was manufactured as in Example 1 except that the contact pressure between the fabric and the sheeting knife was maintained at 0.8 N/cm and the deposit of the resin was adjusted to 15 g/m².

The characteristics of the airbag base fabric thus manufactured were shown in Table 1. This airbag base fabric presented no problem in the air-barrier property, the airbag mountability and compactness, and the flame resistance. However, the adhesion of the resin was poor.

Comparative Example 2

A coated airbag base fabric was manufactured as in Example 1 except that nylon 6,6 fiber used in Example 1 was twisted at 100 T/m and the resin was applied at 15 g/m² using a comma coater (the contact pressure between the fabric and the comma coater was 0 N/cm).

The characteristics of the airbag base fabric thus manufactured were shown in Table 1. This airbag base fabric presented no problem in the air-barrier property, the airbag mountability and compactness, and the flame resistance. However, the adhesion of the resin was poor.

Example 2

Filament yarns used had a flat cross section and were made of no-twist nylon 6,6 fiber having the total fineness of 350 dtex, 96 filaments, the strength of 8.4 cN/dtex, the extension percentage of 22%, and the aspect ratio of 3.0. A plain weave fabric was manufactured from the filament yarns with a water-jet loom. The warp tension was 100 cN per warp. The weave densities of the warp and the weft were both adjusted to 59/2.54 cm. Then, the fabric was coated with a methyl vinyl silicone resin in toluene (resin solid content 80%) having a viscosity of 8 Pa·s (8,000 cP) using a floating knife coater with a sheeting knife. The contact pressure between the fabric and the sheeting knife was maintained at 2 N/cm. The deposit of the resin was adjusted to 20 g/m². Then, the coated fabric was dried at 130° C. for 1 minute and was vulcanized at 200° C. for 2 minutes. A coated airbag base fabric was thus manufactured.

The characteristics of the airbag base fabric thus manufactured were shown in Table 1. The airbag base fabric was excellent in the air-barrier property, the airbag mountability and compactness, and the flame resistance. The airbag base fabric also exhibited excellent adhesion to the resin.

Comparative Example 3

The plain weave fabric manufactured in Example 2 was coated with a methyl vinyl silicone resin in toluene (resin solid content 90%) having a viscosity of 25 Pa·s (25,000 cP) using a comma coater (the contact pressure between the fabric and the comma coater was 0 N/cm). The deposit of the resin was adjusted to 35 g/m². Then, the coated fabric was dried at 130° C. for 1 minute and was vulcanized at 200° C. for 2 minutes. A coated airbag base fabric was thus manufactured.

The characteristics of the airbag base fabric thus manufactured were shown in Table 1. This airbag base fabric presented no problem in the air-barrier property and the flame resistance. However, the airbag mountability and compactness and the adhesion of the resin were poor.

Comparative Example 4

A coated airbag base fabric was manufactured as in Example 2 except that the contact pressure between the fabric and the sheeting knife was maintained at 17 N/cm and the deposit of the resin was adjusted to 4 g/m².

The characteristics of the airbag base fabric thus manufactured were shown in Table 1. This airbag base fabric presented no problem in the airbag mountability and compactness. However, because a continuous resin film was not formed on the fabric, the air-barrier property, the flame resistance, and the adhesion of the resin were poor.

Example 3

Filament yarns used had a circular cross section and were made of no-twist nylon 6 fiber having the total fineness of 235 dtex, 72 filaments, the strength of 8.4 cN/dtex, the extension percentage of 24%, and the aspect ratio of 1.0. A plain weave fabric was manufactured from the filament yarns with an air-jet loom. The warp tension was 90 cN per warp. The weave densities of the warp and the weft were both adjusted to 76/2.54 cm. Then, this fabric was dipped in a hot-water bath containing 0.5 g/l sodium alkylbenzene sulfonate and 0.5 g/l soda ash at 80° C. for 3 minutes, was dried at 130° C. for 2 minutes, and was subjected to heat set at 180° C. for 1 minute. After the heat set, the fabric was coated with an aqueous urethane resin solution (resin solid content 50%) having a viscosity of 10 Pa·s (10,000 cP) using a floating knife coater with a sheeting knife. The contact pressure between the fabric and the sheeting knife was maintained at 6 N/cm. The deposit of the resin was adjusted to 20 g/m². Then, the coated fabric was dried at 130° C. for 1 minute. A coated airbag base fabric was thus manufactured.

The characteristics of the airbag base fabric thus manufactured were shown in Table 1. The airbag base fabric was excellent in the air-barrier property, the airbag mountability and compactness, and the flame resistance. The airbag base fabric also exhibited excellent adhesion to the resin.

Comparative Example 5

The fabric obtained after the heat set in Example 3 was coated with an aqueous urethane resin solution (resin solid content 50%) having a viscosity of 23 Pa·s (23,000 cP) using a floating knife coater with a sheeting knife. The contact pressure between the fabric and the sheeting knife was maintained at 16 N/cm. The deposit of the resin was adjusted to 20 g/m². Then, the coated fabric was dried at 130° C. for 1 minute. A coated airbag base fabric was thus manufactured.

The characteristics of the airbag base fabric thus manufactured were shown in Table 1. This airbag base fabric presented no problem in the air-barrier property, the airbag mountability and compactness, and the flame resistance. However, the adhesion of the resin was poor.

Comparative Example 6

The fabric obtained after the heat set in Example 3 was dipped in an aqueous urethane resin solution (resin solid content 50%) having a viscosity 3 Pa·s (3,000 cP). The fabric was squeezed with a mangle to adjust the resin deposit to 10 g/m² by solid content and was dried at 130° C. for 2 minutes. An airbag base fabric was thus manufactured.

The characteristics of the airbag base fabric thus manufactured were shown in Table 1. This airbag base fabric presented no problem in the adhesion of the resin. However, the air-barrier property and the airbag mountability and compactness were poor.

Example 4

A plain weave fabric was manufactured by weaving no-twist nylon 6,6 fibers having the total fineness of 470 dtex, 72 filaments, the strength of 8.5 cN/dtex, and the extension percentage of 21% with a water-jet loom. The cross section of the nylon 6,6 fiber had an aspect ratio of 1.0. The weave densities of the warp and the weft were both 55/2.54 cm. The fabric was subjected to heat set at 190° C. for 1 minute. The fabric obtained after the heat set was coated with a solventless methyl vinyl silicone resin solution having a viscosity of 15 Pa·s (15,000 cP) using a floating knife coater with a sheeting knife. The contact pressure between the fabric and the sheeting knife was maintained at 10 N/cm. The tension of the base fabric was adjusted to 2620 N/m. The deposit of the resin was adjusted to 18 g/m². Then, the coated fabric was vulcanized at 190° C. for 2 minutes. A coated airbag base fabric was thus manufactured.

The characteristics of the airbag base fabric thus manufactured were shown in Table 1. The airbag base fabric was excellent in the air-barrier property, the airbag mountability and compactness, and the flame resistance. The airbag base fabric also exhibited excellent adhesion to the resin.

Comparative Example 7

The fabric obtained after the heat set in Example 4 was coated with the same solventless methyl vinyl silicone resin solution as that used in Example 4 using a floating knife coater with a sheeting knife. The contact pressure between the fabric and the sheeting knife was maintained at 0.6 N/cm. The tension of the base fabric was adjusted to 2620 N/m. The deposit of the resin was adjusted to 30 g/m². Then, the coated fabric was vulcanized at 190° C. for 2 minutes. A coated airbag base fabric was thus manufactured.

The characteristics of the airbag base fabric thus manufactured were shown in Table 1. This airbag base fabric presented no problem in the air-barrier property, the airbag mountability and compactness, and the flame resistance. However, the adhesion of the resin was poor.

Example 5

A plain weave fabric was manufactured from no-twist nylon 6,6 fiber filament yarns having the total fineness of 470 dtex, 72 filaments, the strength of 8.4 cN/dtex, and the extension percentage of 22% with a water-jet loom. The cross section of the nylon 6,6 fiber had an aspect ratio of 1.0 (circular cross section). The weave densities of the warp and the weft were both adjusted to 54/2.54 cm. Then, this fabric was dipped in a hot-water bath containing 0.5 g/l sodium alkylbenzene sulfonate and 0.5 g/l soda ash at 80° C. for 3 minutes, was dried at 130° C. for 2 minutes, and was subjected to heat set at 190° C. for 1 minute. The residual oil content in the fabric after the heat set was 0.04% by weight. Then, the fabric was coated with a solventless methyl vinyl silicone resin solution having a viscosity of 12 Pa·s (12,000 cP) using a floating knife coater with a sheeting knife. The resin deposit was adjusted to 15 g/m². The coated fabric was vulcanized at 190° C. for 2 minutes. Thus, a coated airbag base fabric was produced. The residual oil content in the base fabric was 0.04% by weight.

The characteristics of the airbag base fabric thus manufactured were shown in Table 1. The airbag base fabric was excellent in the air-barrier property, the airbag mountability and compactness, and the flame resistance. The airbag base fabric also exhibited excellent adhesion to the resin.

Example 6

A plain weave fabric was manufactured by weaving no-twist nylon 6,6 fiber filament yarns having the total fineness of 470 dtex, 72 filaments, the strength of 8.4 cN/dtex, and the extension percentage of 22% with a water-jet loom. The cross section of the nylon 6,6 fiber had an aspect ratio of 1.0 (circular cross section). The weave densities of the warp and the weft were both adjusted to 54/2.54 cm. Then, the fabric was subjected to heat set at 160° C. for 1 minute. The residual oil content in the fabric after the heat set was 0.08% by weight. Then, the fabric was coated with a solventless methyl vinyl silicone resin solution having a viscosity of 12 Pa·s (12,000 cP) using a floating knife coater with a sheeting knife. The resin deposit was adjusted to 23 g/m². The coated fabric was vulcanized at 190° C. for 2 minutes. A coated airbag base fabric was thus manufactured. The residual oil content in the base fabric was 0.08% by weight.

The characteristics of the airbag base fabric thus manufactured were shown in Table 1. The airbag base fabric was excellent in the air-barrier property, the airbag mountability and compactness, and the flame resistance. The airbag base fabric also exhibited excellent mechanical properties and excellent adhesion to the resin.

Comparative Example 8

A plain weave fabric was manufactured from no-twist nylon 6,6 fiber filament yarns having the total fineness of 470 dtex, 72 filaments, the strength of 8.4 cN/dtex, and the extension percentage of 22% with a water-jet loom. The cross section of the nylon 6,6 fiber had an aspect ratio of 1.0 (circular cross section). The weave densities of the warp and the weft were adjusted to 58/2.54 cm and 56/2.54 cm, respectively. Then, this fabric was dipped in a hot-water bath containing 0.5 g/l sodium alkylbenzene sulfonate and 0.5 g/l soda ash at 80° C. for 3 minutes, was dried at 130° C. for 2 minutes, and was subjected to heat set at 190° C. for 1 minute. The residual oil content in the fabric after the heat set was 0.04% by weight. Then, the fabric was coated with a solventless methyl vinyl silicone resin solution having a viscosity of 12 Pa·s (12,000 cP) using a floating knife coater with a sheeting knife. The resin deposit was adjusted to 26 g/m². The coated fabric was vulcanized at 190° C. for 2 minutes. A coated airbag base fabric was thus manufactured. The residual oil content in the base fabric was 0.04% by weight.

The characteristics of the airbag base fabric thus manufactured were shown in Table 1. This airbag base fabric presented no problems in the air-barrier property, the mechanical properties, and the flame resistance. However, the airbag base fabric had poor adhesion to the resin. In addition, the airbag base fabric was thick and had a large bending resistance, and thereby the airbag mountability and compactness was poor.

Example 7

A plain weave fabric was manufactured from no-twist nylon 6,6 fiber filament yarns having the total fineness of 350 dtex, 96 filaments, the strength of 8.4 cN/dtex, and the extension percentage of 22% with an air-jet loom. The cross section of the nylon 6,6 fiber had an aspect ratio of 3.0 (flat cross section). The weave densities of the warp and the weft were both adjusted to 63/2.54 cm. Then, this fabric was dipped in a hot-water bath containing 0.5 g/l sodium alkylbenzene sulfonate and 0.5 g/l soda ash at 80° C. for 3 minutes, was dried at 130° C. for 2 minutes, and was subjected to heat set at 190° C. for 1 minute. The residual oil content in the fabric after the heat set was 0.05% by weight. Then, the fabric was coated with a methyl vinyl silicone resin in toluene (resin solid content 80%) having a viscosity of 8 Pa·s (8,000 cP) using a floating knife coater with a sheeting knife. The resin deposit was adjusted to 10 g/m². The coated fabric was dried at 130° C. for 1 minute and was vulcanized at 200° C. for 2 minutes. A coated airbag base fabric was thus produced. The residual oil content in the base fabric was 0.05% by weight.

The characteristics of the airbag base fabric thus manufactured were shown in Table 1. The airbag base fabric was excellent in the air-barrier property, the airbag mountability and compactness, and the flame resistance. The airbag base fabric also exhibited excellent adhesion to the resin.

Comparative Example 9

A plain weave fabric was manufactured from no-twist nylon 6,6 fiber filament yarns having the total fineness of 350 dtex, 96 filaments, the strength of 8.4 cN/dtex, and the extension percentage of 22% with an air-jet loom. The cross section of the nylon 6,6 fiber had an aspect ratio of 3.0 (flat cross section). The weave densities of the warp and the weft were both adjusted to 57/2.54 cm. The residual oil content in the base fabric was 0.17% by weight. Then, the fabric was coated with a methyl vinyl silicone resin in toluene (resin solid content 80%) having a viscosity of 8 Pa·s (8,000 cP) using a floating knife coater with a sheeting knife. The resin deposit was adjusted to 4 g/m². The coated fabric was dried at 130° C. for 1 minute and was vulcanized at 200° C. for 2 minutes. A coated airbag base fabric was thus produced. The residual oil content in the base fabric was 0.17% by weight.

The characteristics of the airbag base fabric thus manufactured were shown in Table 1. This airbag base fabric presented no problem in the airbag mountability and compactness. However, the air-barrier property, the adhesion to the resin, and the flame resistance were poor.

TABLE 1

| | Example 1 | Comparative Example 1 | Comparative Example 2 | Example 2 | Comparative Example 3 | Comparative Example 4 | Example 3 | Comparative Example 5 | Comparative Example 6 |
|---|---|---|---|---|---|---|---|---|---|
| Total fineness (dtex) | 470 | 470 | 470 | 350 | 350 | 350 | 235 | 235 | 235 |
| Number of filaments | 72 | 72 | 72 | 96 | 96 | 96 | 72 | 72 | 72 |
| Aspect ratio | 1 | 1 | 1 | 3 | 3 | 3 | 1 | 1 | 1 |
| Density of gray fabric (/2.54 cm)* | 46/46 | 46/46 | 46/46 | 59/59 | 59/59 | 59/59 | 76/76 | 76/76 | 76/76 |
| Cover factor | 1885 | 1885 | 1885 | 2094 | 2094 | 2094 | 2229 | 2229 | 2229 |
| Residual oil content in base fabric (% by weight) | 0.06 | 0.07 | 0.11 | 0.05 | 0.05 | 0.07 | 0.03 | 0.05 | 0.04 |
| Resin Deposit (g/m2) | 15 | 15 | 15 | 20 | 35 | 4 | 20 | 20 | 10 |
| Percentage of surrounding (%) | 10.8 | 0 | 0 | 4.8 | 0 | 0 | 18 | 0 | 100 |
| Penetrability (%) | 65 | 8 | 5 | 37 | 8 | 82 | 54 | 70 | 92 |
| Center thickness T1/ End thickness T2 (mm) | 0.28/0.29 | 0.28/0.29 | 0.28/0.3 | 0.25/0.26 | 0.28/0.29 | 0.23/0.23 | 0.22/0.23 | 0.22/0.23 | 0.22/0.22 |
| T1/T2 | 0.97 | 0.97 | 0.93 | 0.96 | 0.97 | 1 | 0.96 | 0.96 | 1 |
| Width of base fabric W (cm) | 150 | 151 | 150 | 153 | 152 | 152 | 154 | 154 | 154 |
| Coating width C (cm) | 146 | 143 | 142 | 147 | 145 | 142 | 148 | 147 | 154 |
| C/W | 0.97 | 0.95 | 0.95 | 0.96 | 0.95 | 0.93 | 0.96 | 0.95 | 1 |
| Tensile force (N/cm)* | 625/657 | 633/659 | 630/662 | 620/639 | 625/640 | 618/635 | 482/490 | 478/485 | 482/488 |
| Elongation at break (%)* | 26/23 | 26/23 | 26/23 | 30/27 | 30/27 | 30/27 | 30/26 | 30/26 | 27/26 |
| Tear strength (N)* | 271/275 | 277/280 | 275/278 | 308/324 | 302/316 | 319/331 | 115/124 | 119/127 | 85/86 |
| Bending resistance (mm)* | 64/68 | 70/70 | 68/72 | 58/63 | 65/73 | 55/58 | 72/85 | 75/88 | 79/95 |
| 125 Pa Air permeability (cc/cm²/sec) | 0 | 0 | 0 | 0 | 0 | 0.04 | 0 | 0 | 0.03 |
| 19.6 kPa Air permeability (cc/cm²/sec) | 0 | 0 | 0 | 0 | 0 | 2.4 | 0 | 0 | 1 |
| Adhesion | ○ | x | x | ○ | x | x | ○ | x | ○ |
| Flame resistance (mm/min)* | 34/33 | 38/35 | 83/77 | 30/28 | 25/23 | 115/132 | 35/32 | 37/36 | 79/73 |
| Mountability (mm) | 36 | 36 | 36 | 36 | 39 | 34 | 30 | 30 | 34 |

| | Example 4 | Comparative Example 7 | Example 5 | Example 6 | Comparative Example 8 | Example 7 | Comparative Example 9 |
|---|---|---|---|---|---|---|---|
| Total fineness (dtex) | 470 | 470 | 470 | 470 | 470 | 350 | 350 |
| Number of filaments | 72 | 72 | 72 | 72 | 72 | 96 | 96 |
| Aspect ratio | 1 | 1 | 1 | 1 | 1 | 3 | 3 |
| Density of gray fabric (/2.54 cm)* | 55/55 | 55/55 | 55/55 | 55/55 | 58/56 | 63/63 | 57/57 |
| Cover factor | 2254 | 2254 | 2254 | 2254 | 2336 | 2236 | 2023 |
| Residual oil content in base fabric (% by weight) | 0.04 | 0.05 | 0.04 | 0.08 | 0.04 | 0.05 | 0.17 |
| Resin Deposit (g/m²) | 18 | 30 | 15 | 23 | 26 | 10 | 4 |
| Percentage of surrounding (%) | 13.9 | 0 | 13.9 | 12.5 | 0 | 10.4 | 0 |
| Penetrability (%) | 36 | 6 | 37 | 32 | 6 | 24 | 5 |
| Center thickness T1/ End thickness T2 (mm) | 0.32/0.33 | 0.33/0.34 | 0.32/0.34 | 0.32/0.34 | 0.35/0.38 | 0.26/0.27 | 0.22/0.23 |

TABLE 1-continued

|  |  |  |  |  |  |  |  |
|---|---|---|---|---|---|---|---|
| T1/T2 | 0.97 | 0.97 | 0.94 | 0.94 | 0.92 | 0.96 | 0.96 |
| Width of base fabric W (cm) | 152 | 152 | 150 | 150 | 147 | 155 | 154 |
| Coating width C (cm) | 148 | 139 | 147 | 146 | 140 | 148 | 136 |
| C/W | 0.97 | 0.91 | 0.98 | 0.97 | 0.95 | 0.95 | 0.88 |
| Tensile force (N/cm)* | 720/715 | 756/728 | 767/750 | 760/755 | 797/764 | 657/660 | 586/591 |
| Elongation at break (%)* | 29/26 | 29/26 | 29/26 | 29/26 | 29/26 | 30/25 | 28/23 |
| Tear strength (N)* | 255/274 | 364/415 | 272/313 | 268/321 | 236/292 | 243/293 | 191/181 |
| Bending resistance (mm)* | 56/82 | 52/72 | 59/86 | 51/80 | 91/121 | 68/81 | 59/77 |
| 125 Pa Air permeability (cc/cm²/sec) | 0 | 0 | 0 | 0 | 0 | 0 | 0.05 |
| 19.6 kPa Air permeability (cc/cm²/sec) | 0 | 0 | 0 | 0 | 0 | 0 | 3.2 |
| Adhesion | ○ | x | ○ | ○ | x | ○ | x |
| Flame resistance (mm/min)* | 38/38 | 52/70 | 57/54 | 68/70 | 66/75 | 61/54 | 123/181 |
| Mountability (mm) | 44 | 46 | 44 | 45 | 50 | 36 | 32 |

*These values in this table represent warp/weft directions.

INDUSTRIAL APPLICABILITY

According to the present invention, a coated airbag base fabric that has an excellent air-barrier property, high heat resistance, and improved mountability and compactness, as well as excellent adhesion to a resin film can be provided. An airbag made of the coated airbag base fabric can also be provided. In addition, a method for producing the coated airbag base fabric can be provided. Thus, the present invention can spread the use of an airbag protection system for an occupant.

The invention claimed is:

1. A coated airbag base fabric comprising a textile fabric composed of multifilament yarns, wherein each multifilament yarn is comprised of single yarns, at least one side of the textile fabric being coated with resin such that at least some of the single yarns constituting the multifilament yarns of the textile fabric are surrounded by the resin, and the other single yarns constituting the multifilament yarns of the textile fabric are not surrounded by the resin, and that the percentage of the single yarns surrounded by the resin ranges from 5% to 15%.

2. The coated airbag base fabric according to claim 1, wherein the percentage of the single yarns surrounded by the resin ranges from 3% to 20% based on the total single yarns.

3. The coated airbag base fabric according to claim 1, wherein the resin infiltrates into the textile fabric to a thickness of from 10% to 70%.

4. The coated airbag base fabric according to claim 3, wherein the resin infiltrates into the textile fabric to a thickness of from 15% to 50%.

5. The coated airbag base fabric according to claim 1, wherein the deposit of the resin is in the range of 5 to 30 g/m².

6. The coated airbag base fabric according to claim 5, wherein the deposit of the resin is in the range of 5 to 20 g/m².

7. The coated airbag base fabric according to claim 1, wherein the resin is a solventless silicone resin.

8. The coated airbag base fabric according to claim 1, wherein the air permeability of the coated airbag base fabric is 0.01 cc/cm²/s or less, as determined by a method according to JIS L1096 A.

9. The coated airbag base fabric according to claim 1, wherein the air permeability of the coated airbag base fabric is 1 cc/cm²/s or less, as determined by the air flow rate passing through the coated airbag base fabric at a fluid (air) pressure of 19.6 kPa.

10. The coated airbag base fabric according to claim 1, wherein the residual oil content in the coated airbag base fabric is 0.1% by weight or less.

11. The coated airbag base fabric according to claim 10, wherein the residual oil content in the textile fabric is 0.1% by weight or less before the resin coating.

12. The coated airbag base fabric according to claim 1, wherein the relationship between the center thickness T1 and the end thickness T2 of the coating is expressed by 0.9≦K T1/T2, and the relationship between the width W of the base fabric and the width C of the resin coat is expressed by 0.95≦C/W≦0.99.

13. The coated airbag base fabric according to claim 12, wherein the relationship between the center thickness T1 and the end thickness T2 of the coating is expressed by 0.95≦T1/T2.

14. The coated airbag base fabric according to claim 1, wherein the coated airbag base fabric has the flame resistance less than 100 rum/min, as determined according to FMVSS302.

15. An airbag using the coated airbag base fabric according to claim 1.

16. A method for manufacturing a coated airbag base fabric, comprising applying a resin solution having a viscosity of from 5 to 20 Pa's (5,000 to 20,000 cP) to a textile fabric composed of multifilament yarns, wherein each multifilament yarn is comprised of single yarns, using a knife coater with a sharp-edged coating knife at a contact pressure between the coating knife and the textile fabric of from 1 to 15 N/cm to cause the resin to infiltrate into the textile fabric to an extent that at least some of the single yarns constituting the multifilament yarns of the textile fabric are surrounded by the resin, and the other single yarns of the multifilament yarns constituting the textile fabric are not surrounded by the resin.

17. The method for manufacturing a coated airbag base fabric according to claim 16, wherein the resin solution is applied to the textile fabric while the tension of the base fabric is in a range of 500 to 3,000 N/m.

18. The method for manufacturing a coated airbag base fabric according to claim 16, wherein the resin solution is applied to the textile fabric without scouring the textile fabric.

* * * * *